(12) United States Patent
Liu et al.

(10) Patent No.: US 11,087,140 B2
(45) Date of Patent: Aug. 10, 2021

(54) INFORMATION GENERATING METHOD AND APPARATUS APPLIED TO TERMINAL DEVICE

(71) Applicant: Baidu Online Network Technology (Beijing) Co., Ltd., Beijing (CN)

(72) Inventors: Kan Liu, Beijing (CN); Jian Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/433,383

(22) Filed: Jun. 6, 2019

(65) Prior Publication Data
US 2020/0019789 A1 Jan. 16, 2020

(30) Foreign Application Priority Data
Jul. 16, 2018 (CN) .......................... 201810778514.8

(51) Int. Cl.
| | | |
|---|---|---|
| *G06N 3/04* | (2006.01) | |
| *G06N 3/08* | (2006.01) | |
| *G06K 9/00* | (2006.01) | |
| *G06K 9/62* | (2006.01) | |

(52) U.S. Cl.
CPC ..... *G06K 9/00771* (2013.01); *G06K 9/00255* (2013.01); *G06K 9/00302* (2013.01); *G06K 9/6256* (2013.01); *G06N 3/0481* (2013.01); *G06N 3/08* (2013.01)

(58) Field of Classification Search
CPC ............. G06K 9/00771; G06K 9/6256; G06K 9/00302; G06K 9/00255; G06N 3/08; G06N 3/0481
USPC ........................................................ 348/143
See application file for complete search history.

(56) References Cited

U.S. PATENT DOCUMENTS

| | | | | |
|---|---|---|---|---|
| 10,257,495 B1 * | 4/2019 | Poder | ................. | G06K 9/00288 |
| 10,306,311 B1 * | 5/2019 | Knas | ........................ | G06F 3/013 |
| 10,475,106 B1 * | 11/2019 | Tang | .................... | G06K 9/6267 |
| 10,503,970 B1 * | 12/2019 | Zhang | ................. | G06K 9/6256 |
| 2009/0115617 A1 * | 5/2009 | Sano | ....................... | H04L 67/306 |
| | | | | 340/573.1 |
| 2011/0131166 A1 * | 6/2011 | Li | ........................ | G06N 3/0436 |
| | | | | 706/25 |
| 2013/0050522 A1 * | 2/2013 | Mineshita | ........ | G08B 13/19686 |
| | | | | 348/222.1 |

(Continued)

FOREIGN PATENT DOCUMENTS

| | | |
|---|---|---|
| CN | 101237563 | 8/2008 |
| CN | 104112209 | 10/2014 |

(Continued)

*Primary Examiner* — Joon Kwon
(74) *Attorney, Agent, or Firm* — Knobbe, Martens, Olson & Bear LLP

(57) ABSTRACT

The present disclosure relates to an information generating method and apparatus applied to a terminal device. A method may include: acquiring, in real time, a video frame image collected by a target camera; storing the acquired video frame image as a to-be-processed image; and inputting the to-be-processed image into a pre-trained user attribute recognition model, to obtain user attribute information of a user corresponding to a user image included in the to-be-processed image.

15 Claims, 4 Drawing Sheets

(56) References Cited

U.S. PATENT DOCUMENTS

| | | | | |
|---|---|---|---|---|
| 2015/0324630 A1* | 11/2015 | Sandler | ............... | G06K 9/66 |
| | | | | 382/118 |
| 2018/0004365 A1* | 1/2018 | Fu | ............... | G06K 9/00302 |
| 2018/0185609 A1* | 7/2018 | Zhang | ............... | A61B 5/4812 |
| 2018/0285646 A1* | 10/2018 | Jalan | ............... | G06F 16/583 |
| 2018/0357501 A1* | 12/2018 | Ma | ............... | G06K 9/00288 |
| 2020/0057883 A1* | 2/2020 | Ge | ............... | G06K 9/00248 |
| 2020/0380280 A1* | 12/2020 | Kaede | ............... | G06K 7/10366 |

FOREIGN PATENT DOCUMENTS

| | | |
|---|---|---|
| CN | 105894333 | 8/2016 |
| JP | 2004227158 | 8/2004 |
| JP | 2007181070 | 7/2007 |
| JP | 2012058476 | 3/2012 |
| JP | 2015002477 | 1/2015 |
| JP | 2015064513 | 4/2015 |
| JP | 2017199148 | 11/2017 |

* cited by examiner

INFORMATION GENERATING METHOD AND APPARATUS APPLIED TO TERMINAL DEVICE

CROSS-REFERENCE TO RELATED APPLICATIONS

This application claims priority to Chinese Patent Application No. 201810778514.8, filed on Jul. 16, 2018, titled "Information generating method and apparatus applied to terminal device," which is hereby incorporated by reference in its entirety.

TECHNICAL FIELD

Embodiments of the present disclosure relate to the field of computer technology, and specifically to an information generating method and apparatus applied to a terminal device.

BACKGROUND

At present, there are a large number of offline electronic screens for playing video information. For example, the electronic screens are installed in elevators, subway carriages, bus carriages, taxis, POS (point of sale) machines, running machines and ticket taking machines. As another example, LED (light emitting diode) screens are installed in a university campus or a commercial center.

However, at present, inmost cases the video information played by the offline electronic screens is not customized in real time for the users in front of the electronic screens.

SUMMARY

Embodiments of the present disclosure propose an information generating method and apparatus applied to a terminal device.

In a first aspect, the embodiments of the present disclosure provide an information generating method applied to a terminal device. The method includes: acquiring, in real time, a video frame image collected by a target camera, where a shooting range of the target camera covers an area in front of a target screen, and the terminal device is connected with the target camera by a wire or via a local area network; storing the acquired video frame image as a to-be-processed image; and inputting the to-be-processed image into a pre-trained user attribute recognition model, to obtain user attribute information of a user corresponding to a user image included in the to-be-processed image, the user attribute recognition model representing a corresponding relationship between an image and the user attribute information.

In some embodiments, the method further includes: in response to receiving a user attribute information acquiring request sent by a first terminal device, sending the obtained user attribute information to the first terminal device.

In some embodiments, the user attribute information includes: user image position information and at least one of: gender, age, head pose information, eye information, nose information, mouth information, ear information or facial expression information.

In some embodiments, the user attribute information further includes user image information. The method further includes: intercepting, for each piece of obtained user attribute information, a user image in the to-be-processed image according to user image position information in the user attribute information, and determining user image information in the user attribute information according to the intercepted user image.

In some embodiments, the determining user image information in the user attribute information according to the intercepted user image includes: determining a character string after Base64 encoding performed on the intercepted user image as the user image information in the user attribute information.

In some embodiments, the method further includes: for the each piece of obtained user attribute information, encapsulating the user attribute information as user attribute information in a Json data format.

In some embodiments, the sending the obtained user attribute information to the first terminal device includes: sending the encapsulated user attribute information in the Json data format to the first terminal device.

In some embodiments, the acquiring, in real time, a video frame image collected by a target camera includes: acquiring, in real time, the video frame image collected by the target camera, every preset number of frames.

In a second aspect, the embodiments of the present disclosure provide an information generating apparatus applied to a terminal device. The apparatus includes: an acquiring unit, configured to acquire, in real time, a video frame image collected by a target camera, where a shooting range of the target camera covers an area in front of a target screen, and the terminal device is connected with the target camera by a wire or via a local area network; a storing unit, configured to store the acquired video frame image as a to-be-processed image; and an inputting unit, configured to input the to-be-processed image into a pre-trained user attribute recognition model, to obtain user attribute information of a user corresponding to a user image included in the to-be-processed image, the user attribute recognition model representing a corresponding relationship between an image and the user attribute information.

In some embodiments, the apparatus further includes: a sending unit, configured to send, in response to receiving a user attribute information acquiring request sent by a first terminal device, the obtained user attribute information to the first terminal device.

In some embodiments, the user attribute information includes: user image position information and at least one of: gender, age, head pose information, eye information, nose information, mouth information, ear information or facial expression information.

In some embodiments, the user attribute information further includes user image information. The apparatus further includes: an intercepting unit, configured to intercept, for each piece of obtained user attribute information, a user image in the to-be-processed image according to user image position information in the user attribute information, and determine user image information in the user attribute information according to the intercepted user image.

In some embodiments, the intercepting unit is further configured to: determine a character string after Base64 encoding performed on the intercepted user image as the user image information in the user attribute information.

In some embodiments, the apparatus further includes: an encapsulating unit, configured to encapsulate, for the each piece of obtained user attribute information, the user attribute information as user attribute information in a Json data format.

In some embodiments, the sending unit is further configured to: send the encapsulated user attribute information in the Json data format to the first terminal device.

In some embodiments, the acquiring unit is further configured to: acquire, in real time, the video frame image collected by the target camera, every preset number of frames.

In a third aspect, the embodiments of the present disclosure provide a terminal device. The terminal device includes: one or more processors; and a storage apparatus, configured to store one or more programs. The one or more programs, when executed by the one or more processors, cause the one or more processors to implement the method described in any embodiment in the first aspect.

In a fourth aspect, the embodiments of the present disclosure provide a computer readable medium, storing a computer program. The computer program, when executed by a processor, implements the method described in any embodiment in the first aspect.

According to the information generating method and apparatus applied to a terminal device provided by the embodiments of the present disclosure, the video frame image collected by the target camera is acquired in real time, the shooting range of the target camera covers the area in front of the target screen, and the terminal device is connected with the target camera by the wire or via the local area network. The acquired video frame image is then stored as the to-be-processed image. Finally, the to-be-processed image is inputted into the pre-trained user attribute recognition model, to obtain the user attribute information of the user corresponding to the user image included in the to-be-processed image. The user attribute recognition model is used to represent the corresponding relationship between the image and the user attribute information. Accordingly, a local analysis may be performed on viewers in front of the target screen in real time, and the user attribute information of the viewers may be obtained. Thus, references may be provided for subsequent customization for playing contents of the target screen, and then, the playing contents may be customized for the current viewers of the target screen, thereby improving the playing effect of the target screen when playing a video, and reducing the uncontrollability of the remote network environment.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
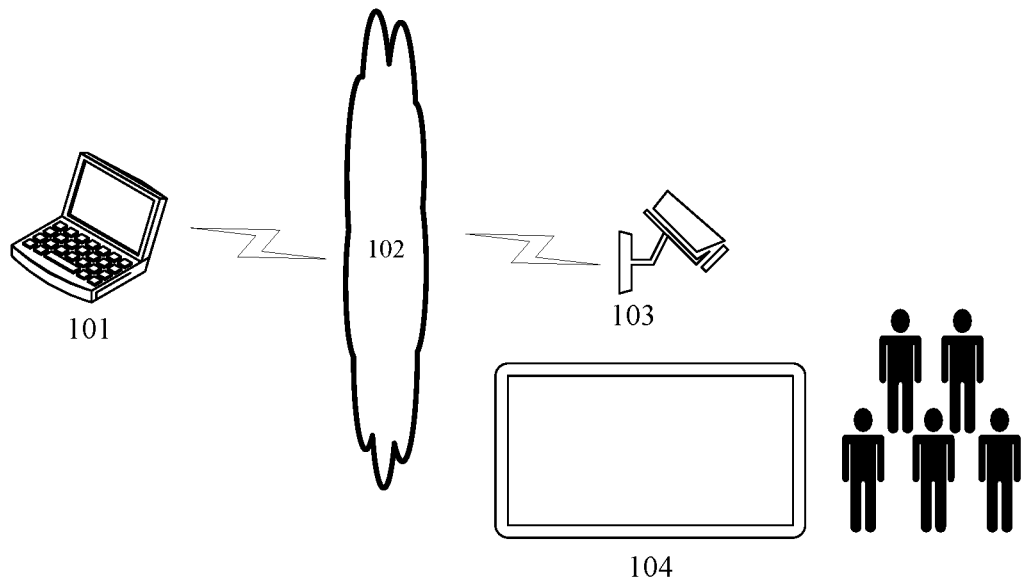
FIG. 1 is a diagram of an exemplary system architecture in which an embodiment of the present disclosure may be applied.

FIG. 1 shows an exemplary system architecture 100 in which an information generating method applied to a terminal device or an information generating apparatus applied to a terminal device according to the present disclosure may be applied.

As shown in FIG. 1, the system architecture 100 may include a terminal device 101, a network 102, a camera 103 and an electronic screen 104. The network 102 serves as a medium providing a communication link between the terminal device 101 and the camera 103. The network 102 may include a wired (e.g., a universal serial bus interface data wire) connection or a local area network connection. The shooting range of the camera 103 covers an area in front of the electronic screen 104, that is, the camera 103 may capture viewers in front of the electronic screen 104.

A user may interact with the camera 103 via the network 102 using the terminal device 101, to receive messages. Various communication client applications (e.g., face recognition applications, face detection applications, web browser applications, shopping applications, search applications, instant communication tools, mailbox clients, and social platform software) may be installed on the terminal device 101.

The terminal device 101 may be hardware or software. When being the hardware, the terminal device 101 may be various electronic devices, which include, but not limited to, a smart phone, a tablet computer, a laptop portable computer and a desktop computer. When being the software, the terminal device 101 may be installed in the above listed electronic devices. The terminal device may be implemented as a plurality of software programs or a plurality of software modules (e.g., software or software modules for providing an information generating service), or as a single software program or a single software module, which will not be specifically defined here.

The electronic screen 104 may play video information. The video information played by the electronic screen 104 may be acquired locally from the electronic screen or may be acquired from a cloud server.

It should be noted that the information generating method applied to a terminal device according to the embodiments of the present disclosure is generally performed by the terminal device 101. Correspondingly, the information generating apparatus applied to a terminal device is generally provided in the terminal device 101.

It should be appreciated that the number of the terminal devices, the networks, the cameras and the electronic screens in FIG. 1 are merely illustrative. Any number of terminal devices, networks, cameras and electronic screens may be provided based on actual requirements.

Figure 2:
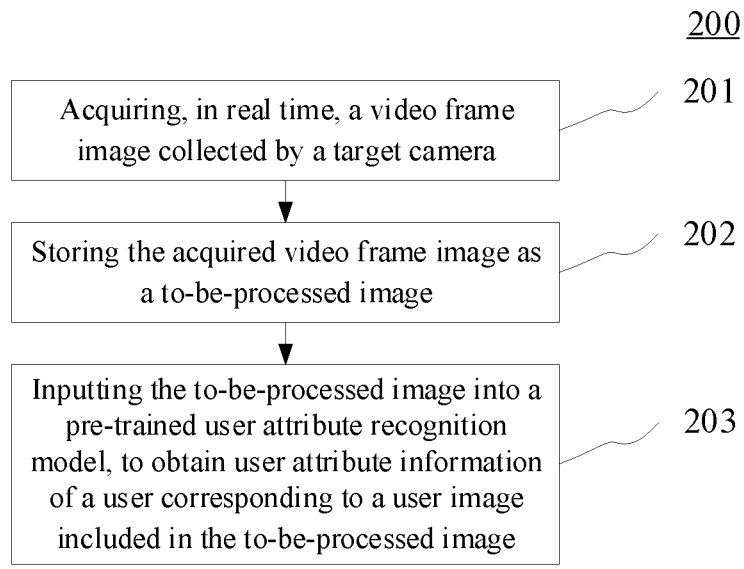
FIG. 2 is a flowchart of an embodiment of an information generating method applied to a terminal device according to the present disclosure.

Further referring to FIG. 2, a flow 200 of an embodiment of an information generating method applied to a terminal device according to the present disclosure is illustrated. The information generating method applied to a terminal device includes the following steps.

Step 201, acquiring, in real time, a video frame image collected by a target camera.

In this embodiment, an executing body (e.g., the terminal device shown in FIG. 1) of the information generating method applied to a terminal device may acquire in real time the video frame image collected by the target camera. The shooting range of the target camera covers an area in front of a target screen. The executing body may be connected with the target camera by a wire or via a local area network. Since the executing body is connected with the target camera by the wire or via the local area network, the executing body may acquire in real time the video frame image collected by the target camera without depending on an external network connection state. Furthermore, since there is no need to connect an external network, it is possible to ensure the security the process of acquiring the video frame image, and keep the process from being under outside attacks.

If the executing body is connected with the target camera by the wire, the executing body may acquire in real time the video frame image collected by the target camera by means of a wired connection.

If the executing body is connected with the target camera via the local area network, the executing body may acquire in real time the video frame image collected by the target camera by means of a local area network connection.

In some alternative implementations of this embodiment, step 201 may also be performed as: acquiring, in real time, the video frame image collected by the target camera, every preset number of frames. Since the collection frequency of the current camera is usually high, the video frame images captured by the camera within several consecutive frames do not change much. If a processing analysis is performed on each frame of image captured by the target camera to obtain user attribute information, unnecessary waste of computing resources will be caused. Therefore, adopting this alternative implementation may reduce the frequency of acquiring the video frame image, and further improve the instantaneity of acquiring the video frame image, thereby reducing the required computing resources.

Step 202, storing the acquired video frame image as a to-be-processed image.

In this embodiment, the executing body (e.g., the terminal device shown in FIG. 1) may store the video frame image acquired in real time in step 201 as the to-be-processed image. Here, the video frame image acquired in real time in step 201 may be stored in a memory of the executing body as the to-be-processed image. In addition, the video frame image acquired in real time in step 201 may also be stored in a hard disc of the executing body as the to-be-processed image.

Step 203, inputting the to-be-processed image into a pre-trained user attribute recognition model, to obtain user attribute information of a user corresponding to a user image included in the to-be-processed image.

In this embodiment, the executing body of the information generating method applied to a terminal device may input the to-be-processed image stored in step 202 into the pre-trained user attribute recognition model, to obtain the user attribute information of the user corresponding to the user image included in the to-be-processed image. It may be understood that if the to-be-processed image does not include the user image, zero piece of user attribute information may be obtained; If the to-be-processed image includes at least one user image, at least one piece of user attribute information may be obtained.

Here, the user attribute information is used to describe a user attribute.

In some alternative implementations of this embodiment, the user attribute information may include: user image position information and at least one of: gender, age, head pose information, eye information, nose information, mouth information, ear information or facial expression information. For example, the head pose information may include an angle of the head rotating left or right, an angle of the head rotating up and down, and an angle of the head rotating back and forth. The eye information may include an eye position and an eye size, the nose information may include a nose position and a nose size, and the ear information may include an ear position and an ear size. The mouth information may include a mouth position and a mouth size, and the facial expression information may include happiness, sadness, anger, fright and the like.

It should be noted that, here, the user attribute recognition model is used to represent a corresponding relationship between an image and the user attribute information.

In some alternative implementations of this embodiment, the user attribute recognition model may be obtained in advance through the following training steps.

First, the model structure information of an initial user attribute recognition model is determined.

It may be understood that since the initial user attribute recognition model may include various types of models for recognizing the user attribute, for different types of models for recognizing the user attribute, the model structure information required to be determined is different. Alternatively, the initial user attribute recognition model may be a convolutional neural network. The convolutional neural network is a multi-layer neural network, each layer is composed of a plurality of two-dimensional planes, and each plane is composed of a plurality of independent neurons. Therefore, there is a need to determine which layers (e.g., a convolutional layer, a pooling layer, and an activation function layer) are included in the initial user attribute recognition model of the convolutional neural network type, a connection order relationship between the layers, which parameters (e.g., weight, bias, and step size of convolution) are included in each layer, and so on. The convolutional layer may be used to extract an image feature. For each convolutional layer, it is possible to determine how many convolution kernels are in the convolutional layer, the size of each convolution kernel, the weight of each neuron in the each convolution kernel, the bias term corresponding to the each convolution kernel, a step size between two adjacent convolutions, whether the convolutional layer needs to be filled, how many pixels are filled, a numerical value used for the filling (usually filled with 0), and so on. The pooling layer may be used to perform downsampling on the inputted information, to compress the amount of data and the number of parameters, thereby reducing overfitting. For each pooling layer, the pooling method of the pooling layer may be determined (e.g., taking a regional average value or taking a regional maximum value). The activation function layer is used to perform a nonlinear calculation on the inputted information. For each activation function layer, a specific activation function may be determined. For example, the activation function may be ReLU and variant activation functions of ReLU, a sigmoid function, a Tan h (hyperbolic tangent) function, a maxout function, or the like. In practice, the convolutional neural network (CNN) is a feedforward neural network, and an artificial neuron of the neural network may respond to a part of surrounding cells within the coverage range. Thus, the convolutional neural network has excellent performance in image processing. Therefore, the convolutional layer may be used to extract the image feature.

Features of an image may be various kinds of basic elements (e.g., color, line and texture) of the image.

Alternatively, the initial user attribute recognition model may further include at least one of: an Adaboost algorithm, a deformable part model (DPM), a deep convolutional neural network, a recursive neural network, or a recurrent neural network. Correspondingly, for different models, the model structure information required to be determined is also different.

Second, a model parameter of the initial user attribute recognition model may be initialized.

In practice, various model parameters of the initial user attribute recognition model may be initialized using some different small random numbers. The "small random numbers" are used to ensure that the training for the model will not be failed because of the model entering into the saturated state due to an excessive weight. "Different" is used to ensure that the model may learn normally.

Third, a training sample set may be acquired.

A training sample may include a sample image and annotation information corresponding to the sample image. The annotation information corresponding to the sample image includes user attribute information of the user corresponding to each user image included in the sample image.

Fourth, the sample image and the annotation information in the training sample in the training sample set may be respectively used as an input and a desired output of the user attribute identification model, and the initial user attribute recognition model may be trained using a machine learning method.

Here, the executing body of the training steps may input the sample image in the training sample in the training sample set into the initial user attribute recognition model, to obtain the user attribute information of the user corresponding to a user image included in the sample image, may use the annotation information in the training sample as the desired output of the initial user attribute recognition model, and may train the initial user attribute recognition model using the machine learning method. Specifically, a difference between the obtained user attribute information and the annotation information in the training sample may be first calculated using a preset loss function. For example, the difference between the obtained user attribute information and the annotation information in the training sample may be calculated by using the L2 norm as the loss function. Then, based on the calculated difference, the model parameter recognized by the initial user attribute may be adjusted, and the training is ended in the situation where a preset training end condition is satisfied. For example, the preset training end condition herein may include at least one of: the training time exceeding a preset time length, the number of trainings exceeding a preset number, or the calculated difference being less than a preset difference threshold.

Here, the model parameter of the initial user attribute recognition model may be adjusted based on the difference between the generated user attribute information and the annotation information in the training sample using various implementations. For example, the model parameter of the initial user attribute recognition model may be adjusted using a Back Propagation (BP) algorithm or a Stochastic Gradient Descent (SGD) algorithm.

Fifth, the initial user attribute recognition model obtained through the training is determined as the pre-trained user attribute recognition model.

Here, the executing body of the training steps may be identical to the above-described executing body. In this way, after obtaining the user attribute recognition model by performing the training steps, the executing body may locally store the user attribute recognition model obtained through the training.

Here, the executing body of the training steps may be different from the above-described executing body. In this way, after obtaining the user attribute recognition model by performing the training steps, the executing body of the training steps may send the user attribute recognition model obtained through the training to the above-described executing body, and thus, the above-described executing body may locally store the received user attribute recognition model.

Figure 3:
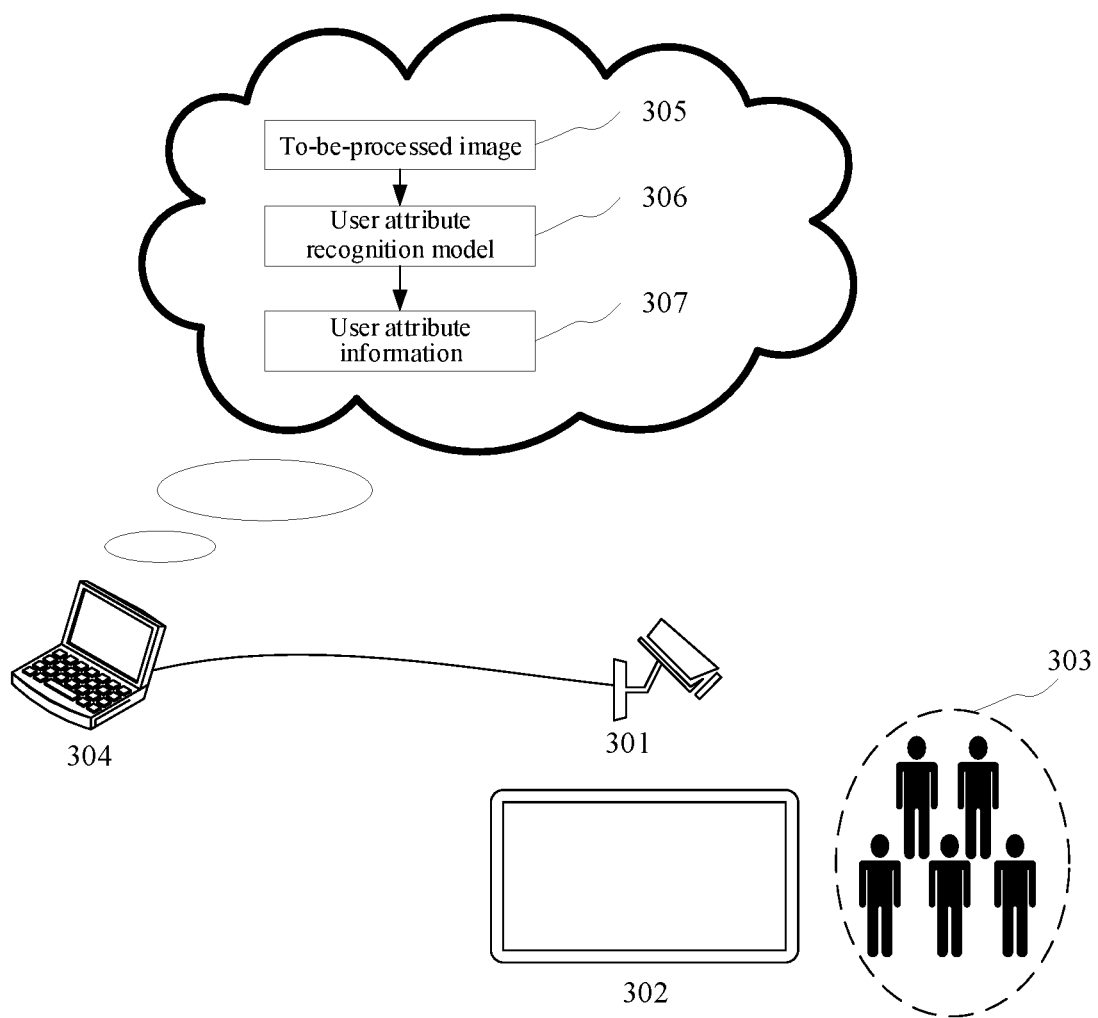
FIG. 3 is a schematic diagram of an application scenario of the information generating method applied to a terminal device according to the present disclosure.

Further referring to FIG. 3, FIG. 3 is a schematic diagram of an application scenario of the information generating method applied to a terminal device according to this embodiment. In the application scenario of FIG. 3, the camera 301 captures video information for the viewers 303 in front of the electronic screen 302, and the terminal device 304 is connected with the camera 301 by a wire. The terminal device 304 acquires, in real time, the video frame image collected by the target camera, stores the acquired video frame image as the to-be-processed image 305, and then inputs the to-be-processed image 305 into the pre-trained user attribute recognition model 306 to obtain the user attribute information 307 of each one of the viewers 303.

In the method provided by the above embodiment of the present disclosure, the video frame image collected by the target camera is acquired in real time, the acquired video frame image is then stored as the to-be-processed image, and finally, the to-be-processed image is inputted into the pre-trained user attribute recognition model to obtain the user attribute information of the user corresponding to the user image included in the to-be-processed image. Accordingly, a local analysis may be performed on viewers in front of the target screen in real time, and the user attribute information of the viewers may be obtained. Thus, references may be provided for subsequent customization for playing contents of the target screen, and then, the playing contents may be customized for the current viewers of the target screen, thereby improving the playing effect of the target screen when playing a video, and reducing the uncontrollability of the remote network environment.

Figure 4:
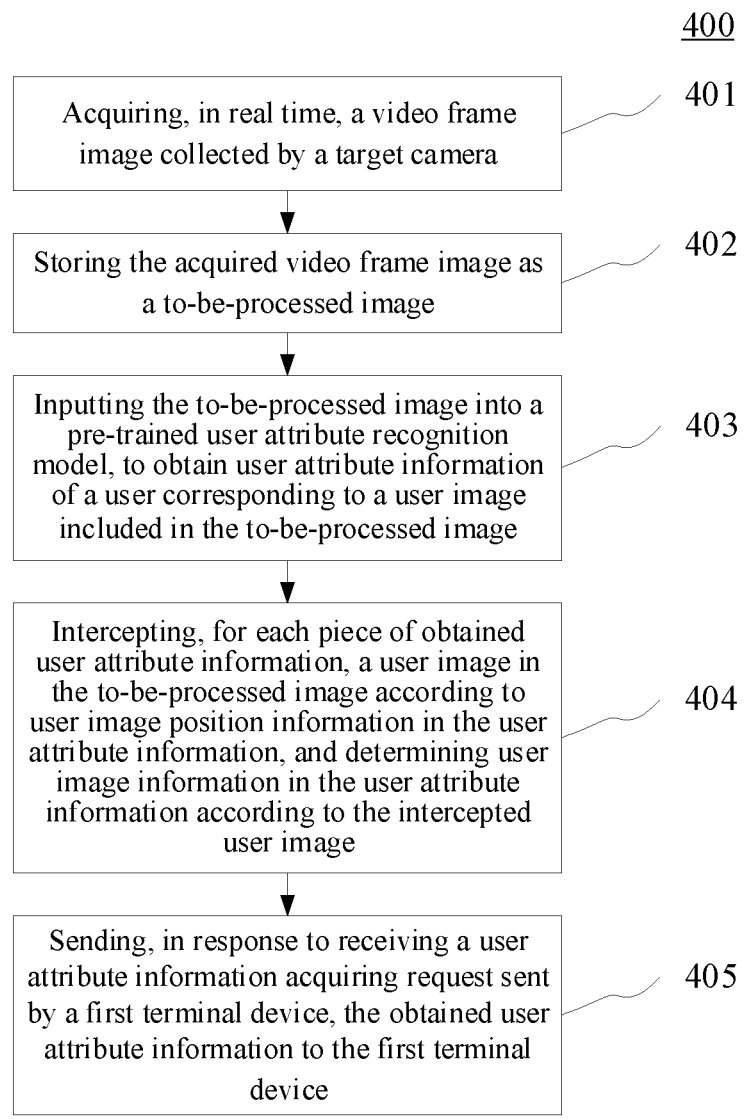
FIG. 4 is a flowchart of another embodiment of the information generating method applied to a terminal device according to the present disclosure.

Further referring to FIG. 4, FIG. 4 illustrates a flow 400 of another embodiment of the information generating method applied to a terminal device. The flow 400 of the information generating method applied to a terminal device includes the following steps.

Step 401, acquiring, in real time, a video frame image collected by a target camera.

Step 402, storing the acquired video frame image as a to-be-processed image.

Step 403, inputting the to-be-processed image into a pre-trained user attribute recognition model, to obtain user attribute information of a user corresponding to a user image included in the to-be-processed image.

The specific operations of the steps 401-403 in this embodiment are substantially the same as the specific operations of the steps 201-203 in the embodiment shown in FIG. 2, which will not be repeatedly described here.

Step 404, intercepting, for each piece of obtained user attribute information, a user image in the to-be-processed image according to user image position information in the user attribute information, and determining user image information in the user attribute information according to the intercepted user image.

In this embodiment, for the each piece of user attribute information obtained in step 403, an executing body (e.g., the terminal device shown in FIG. 1) of the information generating method applied to a terminal device may intercept the user image in the to-be-processed image according to the user image position information in the user attribute information, and determine the user image information in the user attribute information according to the intercepted user image.

Alternatively, the intercepted user image may be determined as the user image information in the user attribute information.

Alternatively, the character string after Base64 encoding performed on the intercepted user image may also be determined as the user image information in the user attribute information.

Step 405, sending, in response to receiving a user attribute information acquiring request sent by a first terminal device, the obtained user attribute information to the first terminal device.

In this embodiment, the executing body (e.g., the terminal device shown in FIG. 1) of the information generating method applied to a terminal device may send the obtained user attribute information to the first terminal device after receiving the user attribute information acquiring request sent by the first terminal device. Here, the first terminal device may be an electronic device that is connected with the executing body via a network and is different from the executing body.

Here, the user attribute information acquiring request may be requests of various forms. For example, the user attribute information acquiring request may be an HTTP (Hypertext Transfer Protocol) request, an FTP (File Transfer Protocol) request, a Socket request, etc. Correspondingly, the executing body provides services of the requests in the corresponding forms to other electronic devices. For example, when the executing body provides an HTTP service, the user attribute information acquiring request may be the HTTP request. When the executing body provides an FTP service, the user attribute information acquiring request may be the FTP request. When the executing body provides a Socket service, the user attribute information acquiring request may be the socket request.

The first terminal device sends the user attribute information acquiring request to the executing body, and obtains the user attribute information sent by the executing body. Thereby, the first terminal device may utilize the obtained user attribute information.

As an example, the first terminal device may display various pieces of received user attribute information. For example, the first terminal device may generate the user image according to the user image information in the various pieces of received user attribute information, present the user image, and present other attribute information (e.g., gender and age) in the corresponding user attribute information around the presented user image.

As another example, the first terminal device may further analyze the various pieces of received user attribute information, and further determine a playing video of a target screen. For example, by analyzing the various pieces of received user attribute information, it is found that the number of men is more than the number of women in the viewers of the target screen, or all of the viewers are men. Thus, it is determined that the target screen plays a video suitable for men to watch, for example, an advertisement about a vehicle, a sports program, and a financial management program. If it is found that the number of women is more than the number of men in the viewers of the target screen, or all of the viewers are women, it is determined that the target screen plays a video suitable for women to watch, for example, an advertisement about a cosmetic product, a housekeeping program, and an emotional program. As another example, by analyzing the various pieces of received user attribute information, it is found that more than 80% of users in the viewers of the target screen are aged between 22 and 30, thus, it is determined that the target screen plays a program suitable for users aged between 22 and 30, for example, an employment advertisement, a workplace experience program, and a real estate rental and sales advertisement.

In some alternative implementations of this embodiment, for the each piece of obtained user attribute information, the executing body may further encapsulate the user attribute information as user attribute information in a Json data format before step 405 and after step 404. Therefore, in step 405, the executing body may send the encapsulated user attribute information in the Json data format to the first terminal device, in response to receiving the user attribute information acquiring request sent by the first terminal device.

It can be seen from FIG. 4 that, as compared with the embodiment corresponding to FIG. 2, the flow 400 of the information generating method applied to a terminal device in this embodiment has an additional step of sending the obtained user attribute information to the first terminal device after the user attribute information acquiring request sent by the first terminal device is received. Accordingly, the solution described in this embodiment may provide the user attribute information of the viewers of the target screen to an external electronic device, thereby implementing the service of providing the user attribute information to other electronic devices.

Figure 5:
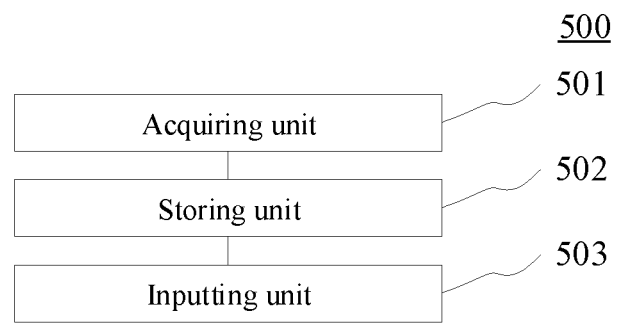
FIG. 5 is a schematic structural diagram of an embodiment of an information generating apparatus applied to a terminal device according to the present disclosure.

Further referring to FIG. 5, as an implementation of the method shown in the above drawings, the present disclosure provides an embodiment of an information generating apparatus applied to a terminal device. The embodiment of the apparatus corresponds to the embodiment of the method shown in FIG. 2. The apparatus may be applied in various electronic devices.

As shown in FIG. 5, the information generation apparatus 500 applied to a terminal device in this embodiment includes: an acquiring unit 501, a storing unit 502 and an inputting unit 503. The acquiring unit 501 is configured to acquire, in real time, a video frame image collected by a target camera. A shooting range of the target camera covers an area in front of a target screen, and the terminal device is connected with the target camera by a wire or via a local area network. The storing unit 502 is configured to store the acquired video frame image as a to-be-processed image. The inputting unit 503 is configured to input the to-be-processed image into a pre-trained user attribute recognition model, to obtain user attribute information of a user corresponding to a user image included in the to-be-processed image. The user attribute recognition model is used to represent a corresponding relationship between an image and the user attribute information.

In this embodiment, for specific processing of the acquiring unit 501, the storing unit 502 and the inputting unit 503 in the information generation apparatus 500 applied to a terminal device, and their technical effects, reference may be made to relative descriptions of step 201, step 202 and step 203 in the corresponding embodiment of FIG. 2 respectively, which will not be repeatedly described here.

In some alternative implementations of this embodiment, the apparatus 500 may further include: a sending unit (not shown in FIG. 5), configured to send, in response to receiving a user attribute information acquiring request sent by a first terminal device, the obtained user attribute information to the first terminal device.

In some alternative implementations of this embodiment, the user attribute information may include: user image position information and at least one of: gender, age, head pose information, eye information, nose information, mouth information, ear information or facial expression information.

In some alternative implementations of this embodiment, the user attribute information may further include user image information. The apparatus 500 may further include: an intercepting unit (not shown in FIG. 5), configured to intercept, for each piece of obtained user attribute information, a user image in the to-be-processed image according to user image position information in the user attribute information, and determine user image information in the user attribute information according to the intercepted user image.

In some alternative implementations of this embodiment, the intercepting unit may be further configured to: determine a character string after Base64 encoding performed on the intercepted user image as the user image information in the user attribute information.

In some alternative implementations of this embodiment, the apparatus may further include: an encapsulating unit (not shown in FIG. 5), configured to encapsulate, for the each piece of obtained user attribute information, the user attribute information as user attribute information in a Json data format.

In some alternative implementations of this embodiment, the sending unit may be further configured to: send the encapsulated user attribute information in the Json data format to the first terminal device.

In some alternative implementations of this embodiment, the acquiring unit 501 may be further configured to: acquire, in real time, the video frame image collected by the target camera, every preset number of frames.

It should be noted that, for the implementation details and the technical effects of the units in the information generating apparatus applied to a terminal device provided by this embodiment of the present disclosure, reference may be made to the descriptions of other embodiments in the present disclosure, which will not be repeatedly described here.

Figure 6:
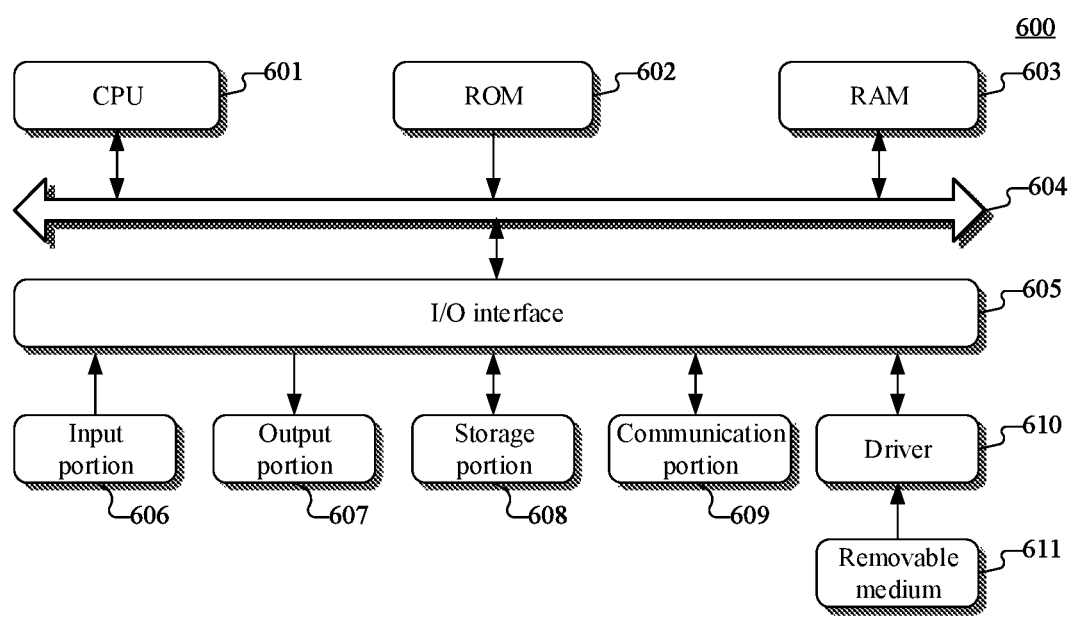
FIG. 6 is a schematic structural diagram of a computer system adapted to implement a terminal device according to the embodiments of the present disclosure.

Referring to FIG. 6, FIG. 6 illustrates a schematic structural diagram of a computer system 600 adapted to implement a terminal device of the embodiments of the present disclosure. The computer system shown in FIG. 6 is merely an example and should not impose any restriction on the function and scope of use of the embodiments of the present disclosure.

As shown in FIG. 6, the computer system 600 includes a central processing unit (CPU) 601, which may execute various appropriate actions and processing in accordance with a program stored in a read-only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other via a bus 604. An input/output (I/O) interface 605 is also connected to the bus 604.

The following components are connected to the Input/Output (I/O) interface 605: an input portion 606 including a keyboard, a mouse. etc.; an output portion 607 including a cathode ray tube (CRT), a liquid crystal display device (LCD), a speaker, etc.; a storage portion 608 including a hard disk and the like; and a communication portion 609 including a network interface card, for example, a LAN (Local Area Network) card and a modem. The communication portion 609 performs communication processing via a network such as the Internet. A driver 610 is also connected to the I/O interface 605 as required. A removable medium. 611, for example, a magnetic disk, an optical disk, a magneto-optical disk, and a semiconductor memory, may be installed on the driver 610, to facilitate the installation of a computer program from the removable medium 611 on the storage portion 608 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or device, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or device or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or device. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language.

The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including an acquiring unit, a storing unit, and an inputting unit. The names of these units do not in some cases constitute a limitation to such units themselves. For example, the acquiring unit may also be described as "a unit for acquiring, in real time, a video frame image collected by a target camera."

In another aspect, the present disclosure further provides a computer readable medium. The computer readable medium may be the computer readable medium included in the apparatus described in the above embodiments, or a stand-alone computer readable medium not assembled into the apparatus. The computer readable medium stores one or more programs. The one or more programs, when executed by the apparatus, cause the apparatus to: acquire, in real time, a video frame image collected by a target camera, where a shooting range of the target camera covers an area in front of a target screen, and the terminal device is connected with the target camera by a wire or via a local area network; store the acquired video frame image as a to-be-processed image; and input the to-be-processed image into a pre-trained user attribute recognition model, to obtain user attribute information of a user corresponding to a user image included in the to-be-processed image, the user attribute recognition model representing a corresponding relationship between an image and the user attribute information.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. An information generating method applied to a terminal device, comprising:
    acquiring, in real time, a video frame image collected by a target camera, wherein a shooting range of the target camera covers an area in front of a target screen, and the terminal device is connected with the target camera by a wire or via a local area network;
    storing the acquired video frame image as a to-be-processed image; and
    inputting the to-be-processed image into a pre-trained user attribute recognition model, to obtain user attribute information of a user corresponding to a user image included in the to-be-processed image, the user attribute recognition model representing a corresponding relationship between an image and the user attribute information,
    wherein the method further comprises:
        in response to receiving a user attribute information acquiring request sent by a first terminal device, sending the obtained user attribute information to the first terminal device, wherein the first terminal device is configured to analyze the user attribute information to determine a playing video of the target screen, the playing video comprising a video suitable for a user corresponding to the user attribute information.

2. The method according to claim 1, wherein the user attribute information comprises: user image position information and at least one of: gender, age, head pose information, eye information, nose information, mouth information, ear information or facial expression information.

3. The method according to claim 2, wherein the user attribute information further comprises user image information, and the method further comprises:
    intercepting, for each piece of obtained user attribute information, a user image in the to-be-processed image according to user image position information in the user attribute information, and determining user image information in the user attribute information according to the intercepted user image.

4. The method according to claim 3, wherein the determining user image information in the user attribute information according to the intercepted user image comprises:
    determining a character string after Base64 encoding performed on the intercepted user image as the user image information in the user attribute information.

5. The method according to claim 4, further comprising:
    for the each piece of obtained user attribute information, encapsulating the user attribute information as user attribute information in a Json data format.

6. The method according to claim 5, wherein the sending the obtained user attribute information to the first terminal device comprises:
    sending the encapsulated user attribute information in the Json data format to the first terminal device.

7. The method according to claim 1, wherein the acquiring, in real time, a video frame image collected by a target camera comprises:
    acquiring, in real time, the video frame image collected by the target camera, every preset number of frames.

8. An information generating apparatus applied to a terminal device, comprising:
   at least one processor; and
   a memory storing instructions, wherein the at least one processor is configured to execute the instructions to:
   acquire, in real time, a video frame image collected by a target camera, wherein a shooting range of the target camera covers an area in front of a target screen, and the terminal device is connected with the target camera by a wire or via a local area network;
   store the acquired video frame image as a to-be-processed image; and
   input the to-be-processed image into a pre-trained user attribute recognition model, to obtain user attribute information of a user corresponding to a user image included in the to-be-processed image, the user attribute recognition model representing a corresponding relationship between an image and the user attribute information,
   wherein the at least one processor is further configured to execute the instructions to:
      in response to receiving a user attribute information acquiring request sent by a first terminal device, send the obtained user attribute information to the first terminal device, wherein the first terminal device is configured to analyze the user attribute information to determine a playing video of the target screen, the playing video comprising a video suitable for a user corresponding to the user attribute information.

9. The apparatus according to claim 8, wherein the user attribute information comprises: user image position information and at least one of: gender, age, head pose information, eye information, nose information, mouth information, ear information or facial expression information.

10. The apparatus according to claim 9, wherein the user attribute information further comprises user image information, and
   the at least one processor is further configured to execute the instructions to:
   intercept, for each piece of obtained user attribute information, a user image in the to-be-processed image according to user image position information in the user attribute information, and determine user image information in the user attribute information according to the intercepted user image.

11. The apparatus according to claim 10, wherein the at least one processor is further configured to execute the instructions to:
   determine a character string after Base64 encoding performed on the intercepted user image as the user image information in the user attribute information.

12. The apparatus according to claim 11, the at least one processor is further configured to execute the instructions to:
   encapsulate, for the each piece of obtained user attribute information, the user attribute information as user attribute information in a Json data format.

13. The apparatus according to claim 12, wherein the at least one processor is further configured to execute the instructions to:
   send the encapsulated user attribute information in the Json data format to the first terminal device.

14. The apparatus according to claim 8, the at least one processor is further configured to execute the instructions to:
   acquire, in real time, the video frame image collected by the target camera, every preset number of frames.

15. A non-transitory computer readable medium, storing a computer program, wherein the program, when executed by a processor, implements the method according to claim 1.

* * * * *